Figures 1, 2:
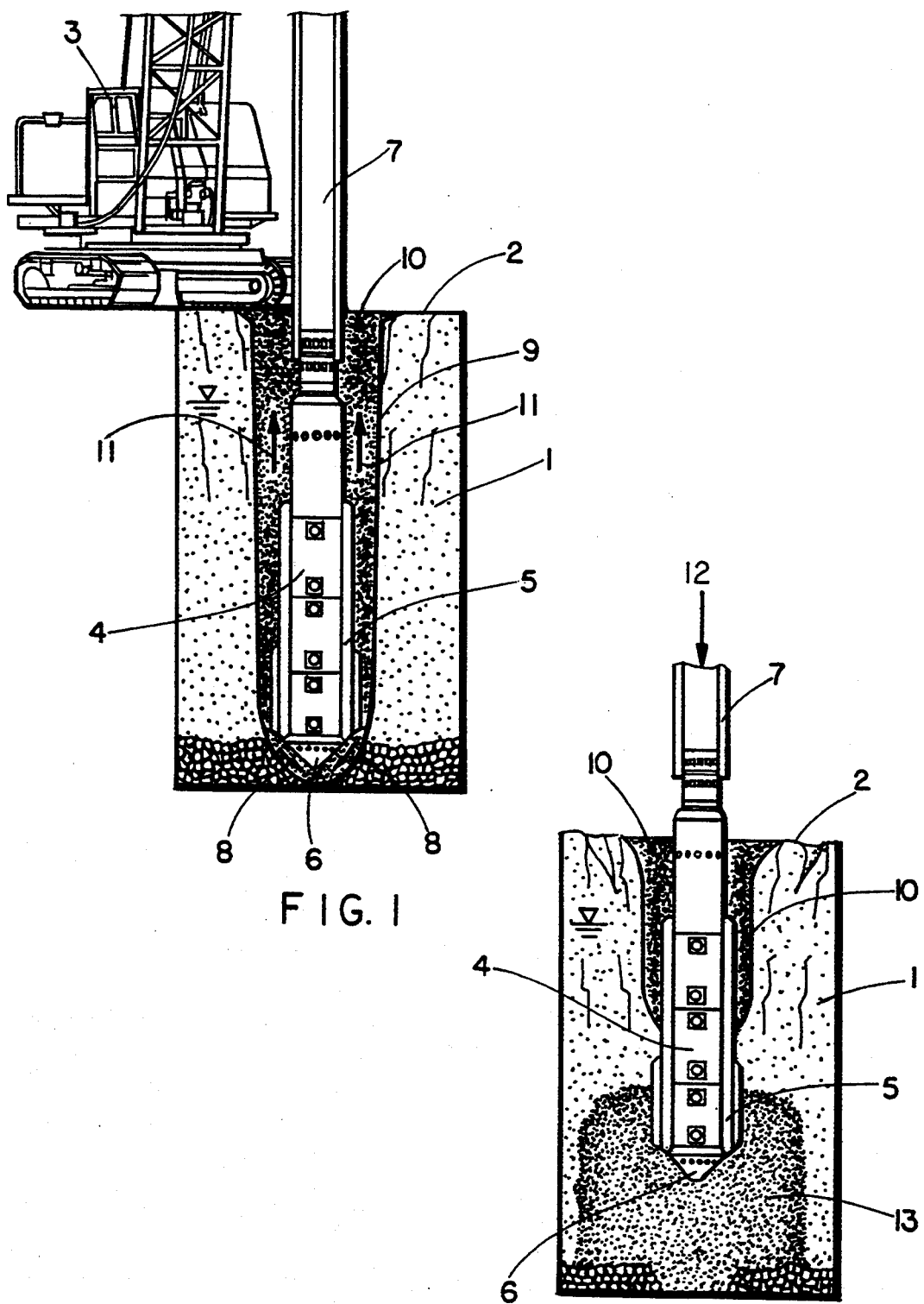

United States Patent [19]

Esters et al.

[11] Patent Number: 5,421,673
[45] Date of Patent: Jun. 6, 1995

[54] METHOD FOR GAINING GARBAGE DUMP SPACE BY MEANS OF GARBAGE COMPACTION

[75] Inventors: Klaus Esters, Essen; Ernst-Werner Raabe, Dortmund, both of Germany

[73] Assignee: Hayward Baker Inc., Odenton, Md.

[21] Appl. No.: 100,690

[22] Filed: Aug. 2, 1993

[30] Foreign Application Priority Data

Oct. 9, 1992 [DE] Germany .......... 42 34 112.4

[51] Int. Cl.⁶ .......................................... B09B 1/00
[52] U.S. Cl. .................................. 405/129; 405/271; 588/250
[58] Field of Search ............ 405/128, 129, 271, 258; 588/249, 250

[56] References Cited

U.S. PATENT DOCUMENTS

| | | | |
|---|---|---|---|
| 2,718,761 | 9/1955 | Steuerman | 405/271 |
| 3,204,414 | 9/1965 | Steuerman | 405/271 |
| 3,498,066 | 3/1970 | Nishimura et al. | 405/271 X |
| 3,675,428 | 7/1972 | Watts | 588/250 |
| 3,835,652 | 9/1974 | Hignite | 405/129 |
| 4,126,007 | 11/1978 | Mars | 405/271 |
| 4,699,546 | 10/1987 | Massarsch | 405/271 |
| 5,139,365 | 8/1992 | Chesner | 405/129 |

FOREIGN PATENT DOCUMENTS

| | | |
|---|---|---|
| 2858144 | 7/1980 | Germany . |
| 3016841 | 11/1984 | Germany . |
| 24718 | 2/1986 | Japan .................. 405/271 |
| 284815 | 12/1987 | Japan .................. 405/271 |

OTHER PUBLICATIONS

"Improvement of the Mechanical Properties of Foundations by Deep Compaction", Baumaschine und Bantechnik, Sep. 1972.

Primary Examiner—Randolph A. Reese
Assistant Examiner—John A. Ricci
Attorney, Agent, or Firm—Ladas & Parry

[57] ABSTRACT

A method for increasing the capacity of a garbage dump to allow additional garbage to be dumped therein, in which a depth packing device, such as a vibrator or ram, is lowered from the surface of the dump down to a predetermined depth to form a hole surrounded by compacted garbage; additional garbage is then placed in the hole and additionally compacted by the same depth packing device used to form the hole. If a vibrator is used, the additional garbage is dispensed from the vibrator tip as the vibrator is withdrawn from the hole so that a compacted column of garbage is formed. A ram device comprising a pipe having a removable closure at the lower end may also be used. As the pipe is withdrawn from the hole, additional garbage is placed through it and out through the lower closure; the additional garbage is compacted with a weight guided through the pipe.

18 Claims, 3 Drawing Sheets

METHOD FOR GAINING GARBAGE DUMP SPACE BY MEANS OF GARBAGE COMPACTION

The invention relates to a method for gaining garbage dump space.

Garbage dumps in the sense of the invention are understood to be all possible deposits or piles or fills of waste materials, with such dumps being established and operated both as piles and as fills of gravel pits, strip mines, etc.

The limited amount of garbage dump space requires a maximum degree of utilization. This means that the greatest possible dump volume must be available on the smallest possible area.

Depending on the age, composition and height of a garbage dump, its degree of compaction can be very different. This means that the utilization of the available dump space also varies from good to poor. If the dump was operated as a fill in a valley and/or a former excavation or gravel pit site or as a dump at a cliff, additional compaction work to ensure optimum use of the dump space by means of the most compact layering of the waste materials was only carried out in very rare cases.

But even in above-ground dumps which are piled up, cavities are formed in the lower regions as the height of the dump is increased, even if each layer is compacted according to plan, particularly due to decomposition of the organic substances, with subsequent gas escape and settling of the remaining materials.

In view of the fact that garbage dump space is becoming increasingly limited, and that the costs for it are increasing, it is therefore viewed as a significant task, in combination with the growing awareness of environmental protection requirements, that the garbage dump space already in use be utilized to the optimum extent.

For this purpose, it is already known to subsequently compact the volume of dumps which are in operation or are already closed, one area at a time. This is done in one known method in that subsequent compaction is carried out in the area near the surface of the dump by means of so-called dynamic intensive compaction, but this only works to a maximum depth of approximately 8 meters. This known method consists in raising a drop weight of 10-20 metric tons on carrier devices, and then dropping it from heights of up to 20 m. The top layers of the dump are compressed by the impact energy. This results in depressions which can then be filled with garbage. By using an appropriate drop point grid, and by repeatedly carrying out the drop process, i.e. by means of multiple passes for the drop weights, relatively good additional compaction and thus utilization of the available garbage dump space can be achieved. However, as already mentioned, this only applies in the region of the dump which is close to the surface, up to a depth of approximately 8 m, and as a function of the type of material with which the dump was originally established, i.e. filled.

However, it has been shown that this known method does not meet all the requirements for desirable optimum use of the existing dump space. This is due to the fact that in dumps which are still in operation, or in the final phase of operation, and in dumps which are soon to be closed or already closed, experience has shown that there are significantly large cavities particularly in the deep dump regions, i.e. in the range from about 10-30 m and more. These particularly occur when the maximum permissible dump volume has been reached, and are due to the insufficient effectiveness of the known compaction method as described and/or to the time progression of the conversion of organic substances contained in the garbage, etc.

Particularly in the case of old dumps, it can be assumed that there are significant portions of cavities, clear spaces and pore spaces in them. This means that the garbage dump space in question cannot be considered to have been optimally used.

Proceeding from this, the invention is based on the task of creating a method to gain garbage dump space which makes it possible to fill existing dumps with additional garbage, especially household garbage, even subsequently, without violating the laws which apply to the external dimensions of the dumps in question.

This task is accomplished by the invention, with the method described and claimed. Advantageous further developments of it are indicated in the dependent claims.

The invention is based on the essential thought of viewing the significant portion of cavities, clear spaces, pore spaces, etc. which are present in existing dumps as a dump volume which is still available for holding additional garbage. For this purpose, subsequent compaction of the dump mass is carried out in the form of depth compaction, in that a depth packing device is used to form packing columns in the dump mass, which consist at least predominantly, preferably entirely, of garbage, particularly of household garbage.

In this way, it is surprisingly possible to fill an existing dump with additional garbage by means of this "garbage packing method" according to the invention, and to optimally use its dump space in this way. It has been shown that an existing dump can take up to at least 10-15% additional garbage volume when using the method according to the invention.

The depth compaction to be carried out according to the invention preferably takes place in dynamic manner, by means of vibration and/or impact energy. However, it is certainly also possible to apply corresponding static energy, for example by means of a static weight guided in a pipe, in order to achieve the depth compaction provided for according to the invention.

In detail, the depth compaction i.e. garbage packing according to the invention can be carried out by means of a ram device or similar device, but is preferably carried out by means of a depth vibrator.

If a ram device or similar device is used, the individual process steps according to the invention consist of introducing the ram device, which particularly can have the form of a pipe or other hollow element with any desired cross-section, with a closure part at the pipe foot that can be removed, into the dump to the planned depth, starting from the dump surface, with the garbage that it encounters being displaced and already precompacted. Then garbage is added, particularly in the foot region of the pipe or similar device, with the pipe then being pulled in sections, with the pipe foot open, in order to allow a certain volume segment of the garbage that was added to exit from the pipe foot. Then compaction and packing of the garbage that was added is carried out by means of a drop weight guided in the pipe, so that a compacted element in the form of a garbage packing column is formed.

If the use of static energy is provided for the purpose of compaction and packing of the garbage that is added, in a variation of the method described above, but still in accordance with the invention, a static weight guided in the pipe is used, instead of the drop weight mentioned before. The latter can be intensified by means of an activation device which is provided at the carrier device which guides the pipe or similar device, if necessary.

If, in contrast, a depth vibrator is used for depth compaction, as provided according to a preferred embodiment of the invention, the method of procedure is such that first, a depth vibrator or similar vibrator is introduced into the dump to the planned depth, starting from the dump surface. The garbage it encounters is displaced and already precompacted when this happens. Then the vibrator is pulled, and at the same time, garbage packing is carried out from bottom to top, by adding the garbage from above, particularly in the region of the vibrator tip, so that a compacted element in the form of a garbage packing column is formed.

For the sake of simplicity, the invention is described in combination with a depth vibrator in the following, although, as mentioned before, other suitable depth packing devices can also be used in order to achieve the goal of the invention.

The method steps of introduction of the vibrator as well as garbage packing are advantageously repeated at a horizontal distance from the garbage packing column just formed. For practical purposes, the garbage packing columns are formed offset relative to one another, in order to achieve the optimum spacing, i.e. the best possible utilization of the dump volume.

Depending on the consistency of an existing dump, garbage packing can take place in one or more method cycles. If desired, bundling of several vibrators can also be carried out in order to achieve a large hole volume.

The garbage intended for incorporation can be treated before being added. For this purpose, it is possible to shred the garbage to a particular particle size or grain size, and/or to press it into pieces, i.e. into bricks. In this connection, it is recommended that the garbage intended for addition via a funnel arranged at the vibrator or via a material line guided along the outside or inside at the vibrator be kept to a grain size of not more than about 50 mm. If, in contrast, the garbage is planned for direct introduction via the annular space between the vibrator and the bore hole wall, as fill from the surface, it is most practical not to exceed a grain size of up to 300 mm.

As already explained, the garbage is introduced in that the vibrator is lowered into the dump from the dump surface, to the planned depth. In this connection, it is most practical if the vibrator tip is lowered to a maximum of 3 m above the base of the dump, in order to avoid a direct or indirect effect on the base insulation.

After the planned vibrator depth is reached, the additional garbage is then added via the material pipe guided on the outside or inside of the vibrator, with this garbage being displaced both laterally and vertically, and thus compacted, by means of the horizontal dynamic energy given off by the vibrator, i.e. the vibrator tip.

It lies within the scope of the invention that this special method step of garbage packing is monitored as well as controlled by means of known operational data measurement and recording devices.

If the garbage is not added to the vibrator tip directly via the material line guided on the vibrator, but rather introduced directly into the annular bore hole space, into the free bore hole, the vibrator can be partly or entirely pulled out of the bore hole in each instance, and then introduced again, in order to compact the garbage that is introduced from the lowest point to the surface, using a step-by-step method.

In any existing dump, there is a basic danger of ignition of the gases present in the dump, particularly methane, hexane, etc., and thus the risk of explosion, with a subsequent dump fire, cannot be precluded, due to the fact that the flame point is reached as a result of the strong friction heat formed during the packing process. This danger can be eliminated, however, by making the area of garbage packing inert, according to the invention. This is preferably done by adding a flushing medium which causes an inert environment, particularly nitrogen in the liquid or gaseous state. Such a flushing medium simultaneously serves as a transport medium for the additional flow of the garbage to be packed, in advantageous manner. The required amount and temperature of the flushing medium, particularly of the nitrogen gas used, is regulated from a liquid nitrogen silo, via an evaporator system, in accordance with the amount of oxygen measured in the borehole, for example. In this way, not only is maximum safety with regard to gas ignition and explosions assured, but also, it is possible to utilize dump areas that are already smoldering or burning, in similar manner as dump areas in which there is no danger, for the purpose of garbage packing, with the only requirement being that the area is made inert at the same time, according to the invention.

It lies within the scope of the invention to pack the garbage into the dump in biologically and/or chemically pretreated or treated form. This makes it possible to bring about or accelerate the biological decomposition of the pollutants contained in the dump space.

Experience has shown that for the method according to the invention, the best degree of utilization in household garbage dumps can be achieved with grid distances between 3–6 m for the garbage packing points, with the latter preferably being arranged in offset manner. Since the vibrator device units used are generally mobile, it is possible to tighten or expand the grid dimensions without special effort, as a function of the holding volume of a garbage packing point.

During implementation of the method according to the invention, it is finally also possible to assure targeted and better degassing of the dump mass, with reference to the various segments. This can be done, for example, in that gas drains are installed, specifically in the form of fills using gravel or similar material as the drain material, or in the form of flexible, semirigid or rigid drain hoses, pipes or similar devices.

Figure 3:
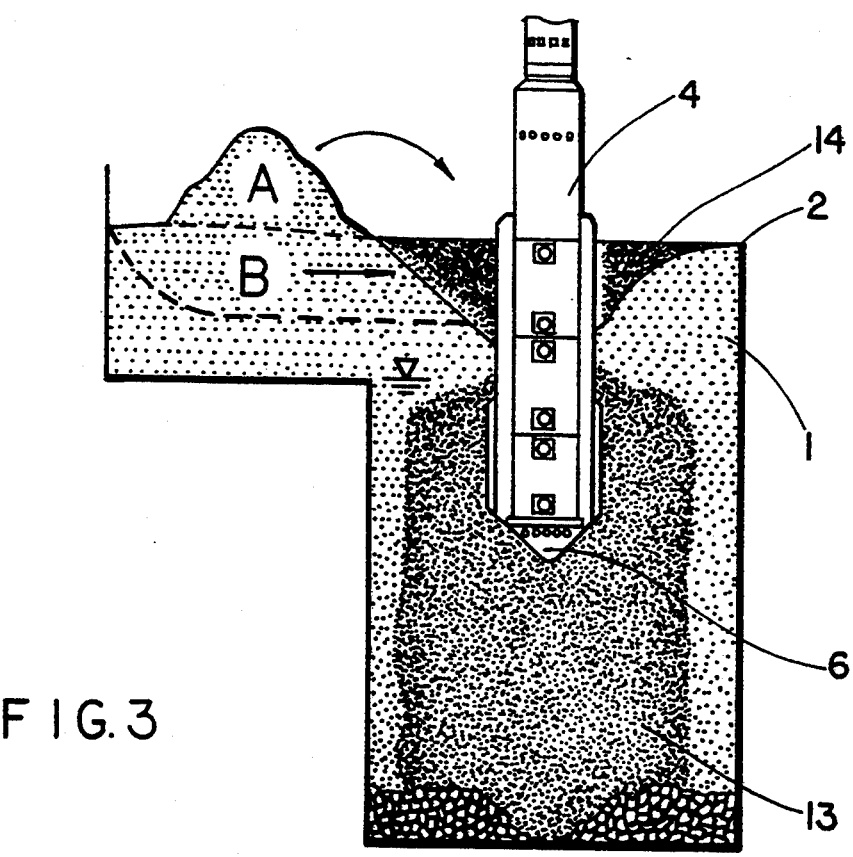
Figure 4:
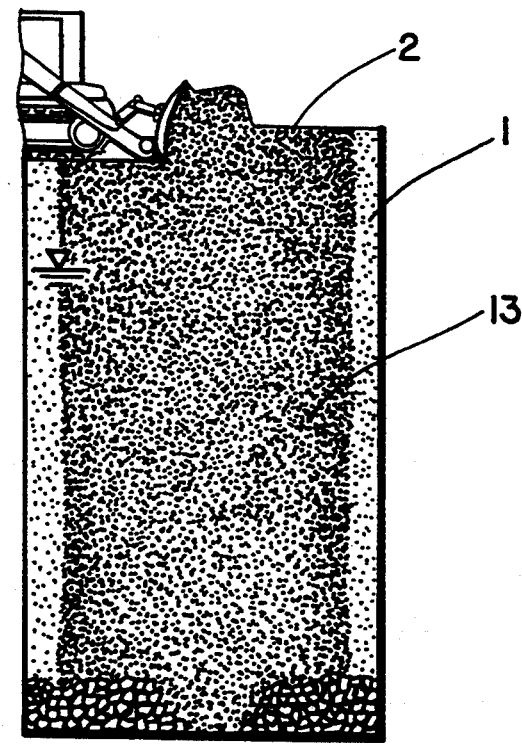

The invention is described in greater detail in the following, on the basis of the drawing. This shows, in schematic form and in a vertical cross-section:

FIG. 1 the method according to the invention when introducing a depth vibrator into the dump mass, FIG. 2 when pulling the vibrator while simultaneously packing garbage, FIG. 3 towards the end of the process, with final filling of garbage, and FIG. 4 after completion of the process, when carrying out final work steps.

Figure 5:
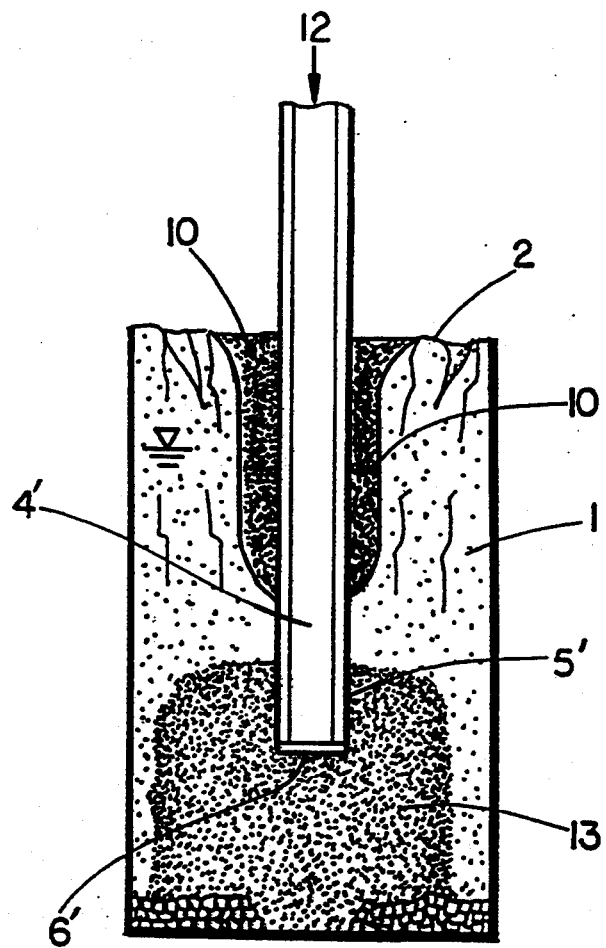

FIG. 5 the method of the invention using a ram device.

The method for gaining dump space shown in the drawing is carried out, as is particularly evident in FIG. 1 and 2, in such a way that a depth vibrator 4 guided by a carrier device 3 is introduced into a dump mass 1 from its surface 2, and lowered to the planned depth. The depth vibrator 4 has a known structure. As is evident from the drawing, it has a flyweight in the lower part of its cylindrical vibrator unit 5, just above the vibrator tip 6, driven by a powerful electric motor. This flyweight causes a rotating impact of the vibrator unit 5, which has significant energy. The vibrator 4 is extended with supplemental pipes 7, as needed, and is guided on the carrier device 3, as already explained.

In order to support the introduction process of the vibrator 4, a flushing medium 8, for example nitrogen gas, is added, which exits at the vibrator tip 6 and then leaves the bore hole 9 via the annular space 10 formed between the vibrator 4 and the wall of the bore hole 9, in the direction of the arrows 11.

After the final depth of the vibrator tip 6 is reached, addition of the flushing medium 8 is reduced or stopped entirely.

As is clearly evident from FIG. 1, the garbage surrounding the bore hole 9 is already displaced and precompacted during introduction of the depth vibrator 4 into the dump mass 1.

If the vibrator 4 has then reached the predetermined depth, the vibrator 4 is pulled in the manner evident from FIG. 2. In this connection, the garbage packing process is carried out at the same time, specifically in stages from bottom to top. For this purpose, garbage 12 is added in prepared, i.e. treated form, via a material line guided in the vibrator 4, which line is not shown in detail, in such a way that it exits in the region of the vibrator tip 6 and gradually forms a compacted base cylinder 13 there, in the form of a rising garbage packing column, while the vibrator 4 is being pulled. This garbage packing column 13 can comprise a base cylinder with a diameter up to 5 m. In this connection, the increasing degree of compaction is shown by the increasing power consumption of the vibrator motor.

If the vibrator 4 has then been almost completely pulled, a corresponding garbage packing column 13 has formed, in the manner evident in FIG. 3. In this connection, a sink funnel 14 might have formed around the vibrator 4, in the region of the bore hole 9, near the dump surface 2. It is practical to fill it with garbage A that is trucked in, or with garbage material B that is already present. In this process, at least 10-15% of the displaced volume can be subsequently added.

After formation of an individual garbage packing column 13, additional garbage packing columns 13 are formed at a horizontal distance from it, specifically offset to the previous column 13, and by repetition of the method described above. In this connection, dump masses 1 of any dimension can be compacted by a suitable arrangement of the compaction centers. After the garbage packing process has been carried out by means of the vibration compaction described, the dump surface 2 is graded and, if desired, a surface vibrator or the known dynamic intensive compaction is used to finish it.

FIG. 5 illustrates a ram device 4' comprising a pipe 5' having a removable closure 6'. The other elements are as described above for FIGS. 1 and 2.

With regard to the characteristics of the invention which are not described in detail above, explicit reference is made to the drawing as well as the claims.

We claim:

1. A method for gaining garbage dump space by means of sequentially compacting areas of a garbage-containing dump mass; said method comprising the following steps:
   a) forming a hole suitable for receiving additional garbage in the dump mass by introducing a depth packing device selected from the group consisting of a depth vibrator which imparts vibration energy, and a ram device which imparts impact energy, into the dump mass to a planned depth, starting from the dump surface, said depth packing device exerting said energy on the garbage of the dump mass to displace it and to precompact it surrounding the hole,
   b) placing additional garbage into the hole, and
   c) packing and compacting the additional garbage in the region of the hole by means of said energy exerted by the same depth packing device used for forming the hole.

2. The method according to claim 1, wherein said depth packing device is a depth vibrator.

3. The method according to claim 2, which comprises the following steps:
   a) introducing a depth vibrator, comprising at its lower end a vibrator tip, into the dump to the planned depth, starting from the dump surface, said depth vibrator displacing and precompacting the garbage it encounters, and
   b) withdrawing the vibrator and simultaneously packing garbage from bottom to top of said hole by introducing additional garbage substantially at the region of the vibrator tip so that a compacted column of packed garbage is formed.

4. The method according claim 1, wherein said depth packing device is a ram device.

5. The method according to claim 4, which comprises the following steps:
   a) introducing a ram device comprising a pipe having removable closure means at a lower end of said pipe into the dump to the planned depth, starting from the dump surface, said ram device displacing and precompacting the garbage that it encounters,
   b) introducing additional garbage substantially at the region of said lower end of the pipe, withdrawing the pipe in sections, with the lower end of the pipe being open, and
   c) compacting and packing the additional garbage by means of a drop weight guided in the pipe, so that a compacted column of packed garbage is formed.

6. The method according to claim 5, wherein instead of the drop weight, a static weight guided in the pipe is used.

7. The method according to claim 3 or 5, wherein garbage packing is carried out continuously while the depth packing device is being withdrawn.

8. The method according to claim 3 or 5, wherein garbage packing is carried out in stages, while the depth packing device is being withdrawn.

9. The method according to claim 1, wherein the steps of introducing the depth packing device and packing additional garbage are repeated at a horizontal distance from the holes packed with garbage previously formed.

10. The method according to claim 9, wherein the holes packed with garbage are formed offset to one another.

11. The method according to claim 1, wherein introduction of the depth packing device is accompanied by addition of a flushing medium selected from the group consisting of a gas and a liquid.

12. The method according to claim 11, wherein the addition of the flushing medium is reduced or terminated after the final depth of the depth packing device has been reached.

13. The method according to claim 1, wherein the steps (b) and (c) are carried out one after the other.

14. The method according claim 1, wherein the additional garbage is added via an annular space between the depth packing device and the hole wall.

15. The method according to claim 1, wherein the additional garbage is added via a material line guided at the outside or inside of the depth packing device.

16. The method according to claim 1, wherein the additional garbage is treated before being added by at least one of shredding to a desired size and compressing into pieces.

17. The method according to claim 1, wherein during garbage packing, the area is made inert by adding a flushing medium which provides an inert environment, with the flushing medium simultaneously acting as the transport medium for the ingoing flow of additional garbage to be packed.

18. The method according to claim 1, wherein the additional garbage to be added is treated by a treatment selected from biological and chemical treatments, to accelerate the biological decomposition of the pollutants contained in the dump mass.

* * * * *